March 1, 1932.                    C. W. SIGEL                    1,847,574
                    PROCESS OF MARKING ARTICLES OF MANUFACTURE
                              Filed Oct. 16, 1930
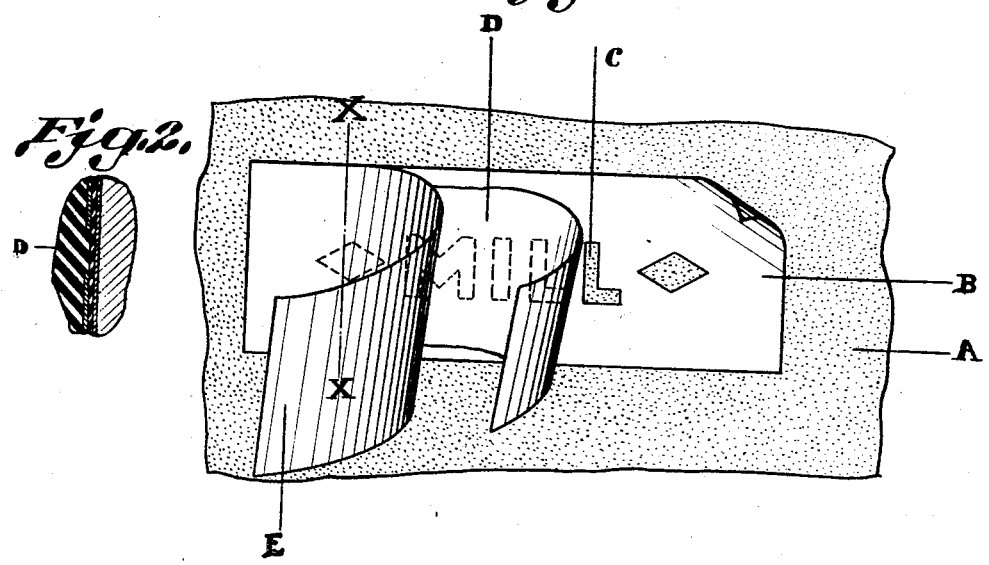
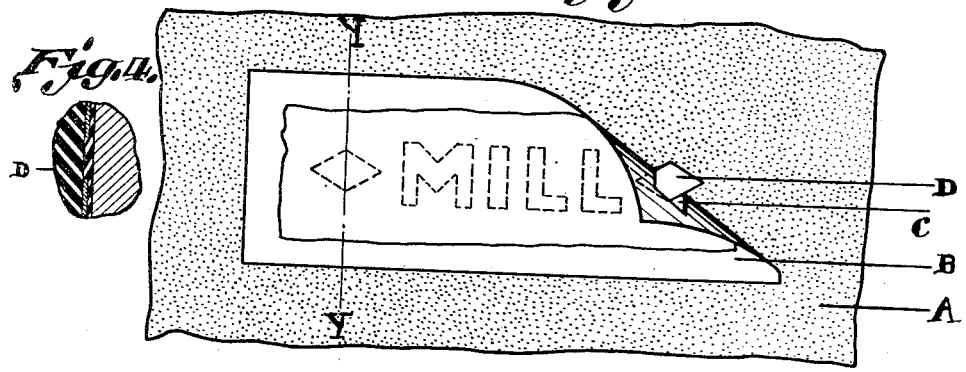
INVENTOR
Carl W. Sigel Patented Mar. 1, 1932

1,847,574

UNITED STATES PATENT OFFICE

CARL W. SIGEL, OF AKRON, OHIO

PROCESS OF MARKING ARTICLES OF MANUFACTURE

Application filed October 16, 1930. Serial No. 489,064.

This invention has for its objects the improvement of the appearance of an article and a means of identification.

With these and other objects in view my invention will be more fully described and illustrated in the drawings in which like letters indicate like parts.

Figures 1 and 3 are plan views of flat rubber articles which show the markings as outlined in the specification.

Figure 2 is a cross sectional view of Figure 1 taken on line XX.

Figure 4 is a cross sectional view of Figure 2 taken on line YY.

The following description covers the process as it applies to articles manufactured of rubber compounds but could well be followed in the manufacture of articles made out of materials other than rubber compounds.

The design of letters, numbers, symbols, patterns or pictures is punched or cut out of a sheet of nonadhesive material such as paper, metal, cloth or other suitable material which will not unite with the rubber during the process of vulcanization.

In the figures A represents the rubber article, B the sheet of nonadhesive material and C the punched or cut out sections of B which forms the word "Mill". Sheet B with the openings, C, is the pattern.

The process involves forcing the compound, of different contrasting color or colors with the rubber articles, into the openings of the pattern.

In Figure 1 the nonadhesive layer B with cut out letters C is disposed on rubber article A. A ply or plies of rubber compound "D" of different color or colors than A is disposed upon layer B. A ply of any suitable nonadhesive material E may be used as a cushion over ply D. It will be noted that a different colored strip of compound could be placed on top of each cut out C in strip B, thus making different colored letters or several colors in each letter. The combination of A, B, D and E is placed in the process of vulcanization under pressure and layer D of rubber compound is forced into the openings C in layer B and into contact with layer A of the article. A bond is formed during vulcanization between rubber compound D within the openings C and the article A. After the vulcanization process is complete, cushion E and ply B are removed leaving the word "Mill" in raised letters and contrasting colors on article A.

In Figure 3 the rubber compounds D forming the word "Mill" are forced into the cut out sections C of the nonadhesive material B. Pattern B containing the compounds D in cut out sections C is disposed on the article A so that compounds D contact with article A. The combination is vulcanized after which the nonadhesive ply or pattern B is removed, leaving the raised letters in contrasting colors on the rubber article.

It will be understood that I am not confining my process to the exact procedure as set forth above as these can be changed and still remain well within the basic principles.

I claim:

1. A method of marking articles of manufacture consisting of forming a design with plastic material within open sections of a pattern of material, disposing the pattern, containing design of different color or colors from the article, on the article, and by physical and chemical treatment unite the design and article into one unit, after which the pattern is removed.

2. A method of marking articles of manufacture consisting of forming a design by forcing plastic material of different colors from the article, into the open sections of a pattern of material, disposing the pattern, containing the design, on the article, contacting the material in design with the article, vulcanizing the combination, and after vulcanization, removing the pattern.

3. A method of marking articles of manufacture consisting of forming a design by placing a plastic layer of material, different in colors from the article, on one face of the pattern of nonadhesive material, containing open sections, disposing the pattern on the article, forcing the layer of material of colors into contact with the article through the openings of the pattern, vulcanizing the combination, and after vulcanization, removing the nonadhesive pattern.

4. A method of marking articles of manufacture consisting of forming a design by placing a plastic layer of material different in colors from the article, on one face of the cut out pattern of nonadhesive material, disposing the pattern on the article, vulcanizing the combination under pressure forcing the layer of colors into contact with the article, and after vulcanization removing the nonadhesive pattern.

5. A method of marking, imprinting or embossing a design in colors on rubber products consisting of forcing uncured rubber compound into the cut out openings of a pattern made of nonadhesive material, disposing the pattern containing the uncured rubber compound on the uncured rubber product, contacting the uncured compound in design with surface of rubber article, vulcanizing the combination under pressure and after vulcanization, removing the nonadhesive material, leaving a raised design in colors on the article.

6. A method of marking, imprinting or embossing a design in colors on rubber products consisting of disposing a thickness of uncured rubber compound upon one face of the cut out pattern of nonadhesive material, disposing the pattern on the rubber product with the nonadhesive material in contact with the rubber article, vulcanizing the combination under pressure forcing the thickness of rubber compound into the openings of pattern and into contact with the article to form a complete union, and after vulcanization, removing the nonadhesive pattern, leaving a raised designed in colors on the article.

In testimony whereof, I affix my signature.

CARL W. SIGEL.